(12) United States Patent
Bau

(10) Patent No.: US 9,245,022 B2
(45) Date of Patent: Jan. 26, 2016

(54) CONTEXT-BASED PERSON SEARCH

(75) Inventor: David Bau, Lincoln, MA (US)

(73) Assignee: Google Inc., Mountain View, CA (US)

(*) Notice: Subject to any disclaimer, the term of this patent is extended or adjusted under 35 U.S.C. 154(b) by 367 days.

(21) Appl. No.: 12/981,879

(22) Filed: Dec. 30, 2010

(65) Prior Publication Data

US 2014/0046921 A1 Feb. 13, 2014

(51) Int. Cl.
*G06F 17/30* (2006.01)

(52) U.S. Cl.
CPC .............................. *G06F 17/30864* (2013.01)

(58) Field of Classification Search
CPC .................................................. G06F 17/30657
See application file for complete search history.

(56) References Cited

U.S. PATENT DOCUMENTS

| | | | | |
|---|---|---|---|---|
| 6,438,543 | B1* | 8/2002 | Kazi | G06F 17/30728 |
| 7,155,427 | B1* | 12/2006 | Prothia | G06F 17/30595 707/694 |
| 7,349,892 | B1* | 3/2008 | Virdy | |
| 7,685,201 | B2 | 3/2010 | Zeng et al. | |
| 8,688,704 | B1* | 4/2014 | Horling et al. | 707/737 |
| 2002/0129015 | A1* | 9/2002 | Caudill et al. | 707/6 |
| 2005/0227676 | A1* | 10/2005 | De Vries | 455/414.1 |
| 2007/0038708 | A1 | 2/2007 | Atyam et al. | |
| 2007/0233656 | A1* | 10/2007 | Bunescu et al. | 707/3 |
| 2007/0239676 | A1* | 10/2007 | Stonehocker et al. | 707/3 |
| 2008/0052262 | A1* | 2/2008 | Kosinov et al. | 707/1 |
| 2009/0070325 | A1* | 3/2009 | Gabriel et al. | 707/5 |
| 2009/0144279 | A1* | 6/2009 | Moe | 707/6 |
| 2009/0327243 | A1* | 12/2009 | Pradhan et al. | 707/3 |
| 2010/0287210 | A1 | 11/2010 | Olof-Ors et al. | |
| 2012/0179748 | A1 | 7/2012 | Hopkins | |
| 2012/0323877 | A1 | 12/2012 | Rat et al. | |
| 2014/0032529 | A1* | 1/2014 | Chang | 707/722 |

OTHER PUBLICATIONS

Bau, David, "Context-Based Person Search," U.S. Appl. No. 12/981,921, filed Dec. 30, 2010.

* cited by examiner

*Primary Examiner* — Neveen Abel Jalil
*Assistant Examiner* — Matthew Ellis
(74) *Attorney, Agent, or Firm* — Fish & Richardson P.C.

(57) ABSTRACT

Methods, systems, and apparatus, including computer programs encoded on computer storage media, for finding person names in electronic resources. In one embodiment, a search query is received. Electronic resources are identified satisfying the search query. A plurality of person names is identified in the resources, wherein each person name is associated with at least one of the resources. A subset of person names is selected from the plurality of person names based on a predetermined metric configured to identify a relative importance of at least one of the person name or resource. A listing of the subset of person names adapted for presentation on a user interface is generated. In certain aspects, multiple person identities can be identified as being associated with person names in the listing. The listing can include resources associated with one of the person identities corresponding to a particular person name in the listing.

21 Claims, 17 Drawing Sheets

200a  215

```
lakers                          210    [Search]
Web  People  Images         Results 1 - 10 of about 19,900,000 for lakers [definition]  (0.38 seconds)
     205

220  Kobe Bryant      Results for Kobe Bryant
     Professional basketball player 265

NBA.com : Kobe Bryant Info Page
240  Kobe Bryant Widget. Now you can take your favorite player profile with you! ... Kobe
     Bryant Player Alerts. Stay connected with your favorite player with NBA ...
     www.nba.com/playerfile/kobe_bryant/ - 102k - Cached - Similar pages -

Kobe Bryant - Wikipedia, the free encyclopedia
     Kobe Bryant was born in Philadelphia, Pennsylvania as the youngest of three
     children and the only son of former Philadelphia 76ers player and former Los ...
     en.wikipedia.org/wiki/Kobe_Bryant - 340k - Cached - Similar pages -

225  Magic Johnson    Results for Magic Johnson
     Former professional basketball player; American entrepreneur Magic Johnson - Wikipedia, the free encyclopedia
245  Earvin "Magic" Johnson, Jr. (born August 14, 1959) is a retired American
     professional basketball player who was a point guard for the Los Angeles Lakers
     en.wikipedia.org/wiki/Magic_Johnson - 365k - Cached - Similar pages -

Magic Johnson
     Non-profit charitable organization promoting the health, social, educational and
     physical well-being of urban youth. Mission, HIV and AIDS, your health, ...
     www.magicjohnson.org/ - 10k - Cached - Similar pages -

230  Phil Jackson     Results for Phil Jackson
     Professional basketball coach; former professional basketball player Phil Jackson - Wikipedia, the free encyclopedia
250  Philip Douglas "Phil" Jackson (born September 17, 1945 in Deer Lodge, Montana) is a
     former professional basketball player and the current head of the Los Angeles Lakers...
     en.wikipedia.org/wiki/Phil_Jackson - 214k - Cached - Similar pages -

235  Pau Gasol    Results for Pau Gasol
     Professional basketball player

NBA.com : Pau Gasol Info Page
255  Pau Gasol Widget. Now you can take your favorite player profile with you! ... Pau Gasol
     Player Alerts. Stay connected with your favorite player with NBA ...
     nba.com/playerfile/pau_gasol - 93k - Cached - Similar pages -
```

| lakers | Search |

Web People Images          Results 1 – 5 of about 1,340,000 for lakers; people:"pau gasol"

260

Pau Gasol   Results for Pau Gasol   Return to People Listing
Professional basketball player In dire need of frontcourt help, Lakers acquire Gasol from...
Feb 3, 2008 ... TORONTO -- The Los Angeles Lakers bolstered their banged-up frontline Friday with a key acquisition -- 7-footer Pau Gasol of the Memphis ....
www.sports.espn.go.com/nba/news/story?id=3226203 - 61k - Cached - Similar pages -

Lakers' Pau Gasol shows he can be tough against Celtics - Los ...
Feb 6, 2009 ... What now, Pau? When Andrew Bynum went down because of a torn ligament in his right knee, all eyes turned to Pau Gasol, with reason.
www.commercialappeal.com/news/2008/feb/01/gasol-traded-lakers/ - 306k -
Cached - Similar pages -

NBA.com : Pau Gasol Info Page
Pau Gasol Widget. Now you can take your favorite player profile with you! ... Pau Gasol Player Alerts. Stay connected with your favorite player with NBA ...
nba.com/playerfile/pau_gasol - 93k - Cached - Similar pages -

Pau Gasol – Los Angeles Lakers Pau Gasol
This is an informational site on Los Angeles Lakers Pau Gasol. Check out our Pau Gasol....
www.paugasol.org/ - 36k - Cached - Similar pages -

Lakers' Pau Gasol to be named NBA All-Star reserve - Los Angeles...
Jan 30, 2009 ... Lakers forward Pau Gasol was selected to the Western Conference All-Stars as a reserve. The Times has learned from a source who was not ...
articles.latimes.com/2009/jan/30/sports/spw-gasol30 - 38k - Cached - Similar pages 1 2 3 4 5 6 7 8 9 10   Next

```
krispy kreme ceo          210    [Search]

Web  People  Images           Results 1 - 10 of about 199,000 for krispy kreme ceo  (0.38 seconds)
205
James Morgan          Results for James Morgan
CEO, Krispy Kreme Doughnuts  270

Krispy Kreme CEO James Morgan speaks March 26 at Appalachian ...
240   Mar 13, 2009 ... Appalachian State University News Bureau. Official news from the
      Appalachian State University Office of Public Affairs.
      www.news.appstate.edu/2009/03/13/james-morgan/ - 35k - Cached - Similar pages -

James H. Morgan Profile - Forbes.com
      Krispy Kreme Doughnuts - 29th on the Forbes 200 Best Small Companies in 2003 ...
      James H. Morgan, CEO/Chairman of the Board/Director/President ...
      people.forbes.com/profile/james-h-morgan/47892 - 42k - Cached - Similar pages -

Vernon Rudolph          Results for Vernon Rudolph
Founder, Krispy Kreme Doughnuts Krispy Kreme - Wikipedia, the free encyclopedia
245   Rudolph began selling the yeast doughnuts in Paducah and delivered them on his ....
      Krispy Kreme CEO departs - Triangle Business Journal; ^
      en.wikipedia.org/wiki/Krispy_Kreme - 64k - Cached - Similar pages -

Vernon Rudolph - Wikipedia, the free encyclopedia
      Vernon Rudolph - Wikipedia, the free encyclopedia
      Vernon Carver Rudolph (June 30, 1915, Marshall County, Kentucky - August 16, 1973)
      was the founder of Krispy Kreme Doughnuts, Inc. ...
      en.wikipedia.org/wiki/Vernon_Rudolph - 22k - Cached - Similar pages -

Daryl Brewster          Results for Daryl Brewster

Krispy Kreme CEO Brewster resigns - Food Inc.- msnbc.com
250   Jan 7, 2008 ... Krispy Kreme Doughnuts Inc. chief executive Daryl Brewster has
      resigned ... Krispy Kreme CEO resigns. Daryl Brewster had been hired to fix ...
      www.msnbc.msn.com/id/22538086/ - 44k - Cached - Similar pages
```

305 RECEIVE A SEARCH QUERY

310 IDENTIFY RESOURCES SATISFYING THE QUERY

315 IDENTIFY PERSON NAMES IN THE RESOURCES

320 SELECT A SUBSET OF PERSON NAMES

325 GENERATE A LISTING FOR PRESENTATION ON A USER INTERFACE

FIG. 3

| | 405 | 415 | 420 |
|---|---|---|---|
| 0001 | www.example.com/ | Martha Jefferson | Martha Jefferson |
| 0003 | www.abelincoln.com | Abraham Lincoln | Abraham Lincoln |
| | | Abraham Lincoln | Abe |
| | | Abraham Lincoln | Lincoln |
| | | Abraham Lincoln | Abraham Lincoln |
| 0004 | www.whitehouse.gov/about/presidents | Abraham Lincoln | Abraham Lincoln |
| | | George Washington | George Washington |
| | | Thomas Jefferson | Thomas Jefferson |
| 0005 | www.history.com/united states | Abraham Lincoln | Abraham Lincoln |
| | | Benjamin Franklin | Benjamin Franklin |
| | | George Washington | George Washington |
| | | Martha Washington | Martha Washington |
| | | Thomas Jefferson | Thomas Jefferson |
| 0007 | www.americanrevolution.com | Benjamin Franklin | Benjamin Franklin |
| | | George Washington | George Washington |
| | | George Washington | George Washington |
| | | Martha Washington | Martha Washington |
| | | Thomas Jefferson | Thomas Jefferson |
| | | Thomas Jefferson | Jefferson |
| 0008 | www.firstladies.com | Martha Washington | Martha Washington |
| | | Martha Jefferson | Martha Jefferson |
| | | George Washington | George Washington |
| | | Thomas Jefferson | Thomas Jefferson |
| 0009 | www.virginia.edu/about | Thomas Jefferson | Thomas Jefferson |
| | | Martha Jefferson | Martha Jefferson |
| | | Martha Jefferson | Martha |
| 0012 | http://en.wikipedia.org/wiki/President_of_the_United_States | Abraham Lincoln | Abraham Lincoln |
| | | George Washington | George Washington |
| | | Thomas Jefferson | Thomas Jefferson |
| 0013 | www.virginia.gov/history | George Washington | George Washington |
| | | Thomas Jefferson | Thomas Jefferson |
| | | Martha Washington | Martha Washington |

FIG. 4

| Rank | Resource | Person Names | Name ID | Total | Close | In Title | Score |
|---|---|---|---|---|---|---|---|
| 1 | en.wikipedia.org/wiki/Elvis_sandwich | Elvis Presley | 00584A2 | 5 | 3 | TRUE | 86 |
| | | Mary Langston | 07376D8 | 1 | 0 | FALSE | 2 |
| 2 | www.foodnetwork.com/paulas-fried-peanut-butter-and-banana-sandwich-recipe.html | Paula Deen | 01354G4 | 2 | 2 | TRUE | 58 |
| 3 | www.epicurious.com/Elvis-Presleys-Hot-Peanut-Butter-and-Banana-Sandwich-332627 | Elvis Presley | 00584A2 | 1 | 1 | TRUE | 38 |
| 4 | archives.cnn.com/2002/TRAVEL/DESTINATIONS/08/13/ep.elvis.eateries | Elvis Presley | 00584A2 | 35 | 6 | FALSE | 78 |
| | | Jerry Schilling | 08471R1 | 4 | 1 | FALSE | 11 |
| | | Richard Nixon | 00427Y8 | 1 | 0 | FALSE | 1 |
| | | Jenna Milly | 08934K2 | 1 | 0 | FALSE | 1 |
| 5 | www.historyofelvis.com/tag/fried-peanut-butter-and-banana-sandwiches | Elvis Presley | 00584A2 | 21 | 3 | TRUE | 47 |
| 6 | en.wikipedia.org/wiki/Fool's_Gold_Loaf | Elvis Presley | 00584A2 | 4 | 2 | FALSE | 10 |
| | | Jerry Kennedy | 01234H6 | 2 | 1 | FALSE | 5 |
| | | Ron Pietrafeso | 00873C4 | 2 | 1 | FALSE | 5 |
| | | Buck Scott | 00342D1 | 3 | 1 | FALSE | 6 |
| 7 | www.suntimes.com/recipes/sandwiches/30413.foo-news-elvis.recipe | Elvis Presley | 00584A2 | 1 | 1 | TRUE | 11 |
| | | Donna Larsen | 0382928 | 1 | 0 | FALSE | 1 |
| 8 | http://www.nytimes.com/mary-jenkins-langston-78-cook-for-presley.html | Elvis Presley | 00584A2 | 25 | 3 | TRUE | 19 |
| | | Mary Langston | 07376D8 | 15 | 3 | TRUE | 16 |

FIG. 6A

| Rank | Person Name | Person ID | Total Resource Score | Frequency | Total Score |
|---|---|---|---|---|---|
| 1 | Elvis Presley | 00584A2 | 289 | 87.5% | 252.875 |
| 2 | Paula Deen | 01354G4 | 58 | 12.5% | 7.25 |
| 3 | Mary Langston | 07376D8 | 18 | 25.0% | 4.5 |
| 4 | Jerry Schilling | 08471R1 | 11 | 12.5% | 1.375 |
| 5 | Buck Scott | 00342D1 | 6 | 12.5% | 0.75 |
| 6 | Jerry Kennedy | 01234H6 | 5 | 12.5% | 0.625 |
| 7 | Ron Pietrafeso | 00873C4 | 5 | 12.5% | 0.625 |
| 8 | Richard Nixon | 00427Y8 | 1 | 12.5% | 0.125 |
| 9 | Jenna Milly | 08934K2 | 1 | 12.5% | 0.125 |
| 10 | Donna Larsen | 03829Z8 | 1 | 12.5% | 0.125 |

FIG. 6B

660 fried peanut butter banana [Search]

Web People Images          Results 1 - 10 of about 243,000 for fried peanut butter banana. (0.28 seconds)

665

Elvis Presley  675  Results for Elvis Presley
American musician; actor

670  Elvis sandwich - Wikipedia, the free encyclopedia
The Elvis sandwich (sometimes simply "The Elvis") is a fried sandwich consisting of peanut butter, bananas, and sometimes bacon....
en.wikipedia.org/wiki/Elvis_sandwich - 21k - Cached - Similar pages -

Elvis Presley's Hot Peanut Butter and Banana Sandwich Recipe at...
Find delicious peanut recipes, like elvis presley's hot peanut butter and banana sandwich, and other American recipes at Epicurious.com.
www.epicurious.com/.../Elvis-Presleys-Hot-Peanut-Butter-and-Banana-Sandwich...
34k - Cached - Similar pages -

CNN.com - A hunka-hunka fried peanut butter - August 26, 2002
A hunka-hunka fried peanut butter. The path to Graceland is a gooey, fattening one ... "The peanut-butter-and-banana sandwich is part of the whole Elvis...
archives.cnn.com/2002/TRAVEL/.../08/13/ep.elvis.eateries/ -
41k - Cached - Similar pages -

Paula Deen      Results for Paula Deen
American television personality; author

Paula's Fried Peanut Butter and Banana Sandwich Recipe : Paula...
Food Network invites you to try this Paula's Fried Peanut Butter and Banana Sandwich recipe from Paula Deen.
www.foodnetwork.com/paulas-fried-peanut-butter-and-banana-sandwich-recipe.html -
81k - Cached - Similar pages -

Mary Langston    Results for Mary Langston

Mary Jenkins Langston, 78, Cook for Presley - The New York Times...
Mary Jenkins Langston, who cooked for Elvis Presley for 14 years, serving him meatloaf, banana icebox pie and his beloved fried peanut butter and banana ... "They had peanut butter and banana sandwiches at Graceland, ...
query.nytimes.com/gst/fullpage.html?res...Top%2FReference%2FTimes%20Topics%2FPeopl... - 43k - Cached - Similar pages -

FIG. 6C

```
fried peanut butter banana                 [ Search ]

Web  People  Images   Results 1 – 5 of about 134,000 for fried peanut butter banana; people:"elvis presley"
     680

Elvis Presley       Results for Elvis Presley   Sort by relevance to: Query  Person
     American musician; actor                                              690    695

Elvis sandwich - Wikipedia, the free encyclopedia
     685 The Elvis sandwich (sometimes simply "The Elvis") is a fried sandwich consisting of
         peanut butter, bananas, and sometimes bacon....
         en.wikipedia.org/wiki/Elvis_sandwich - 21k - Cached - Similar pages -

Elvis Presley's Hot Peanut Butter and Banana Sandwich Recipe at ...
         Find delicious peanut recipes, like elvis presley's hot peanut butter and banana
         sandwich, and other American recipes at Epicurious.com.
         www.epicurious.com/recipes/food/views/Elvis-Presleys-Hot-Peanut-Butter-and-
         Banana-Sandwich-232627 - 87k - Cached - Similar pages -

CNN.com - A hunka-hunka fried peanut butter - August 26, 2002
         Slather peanut butter and place sliced bananas on two pieces of white ... and only one
         food will do -- fried peanut-butter-and-banana sandwiches, naturally. ...
         premium.edition.cnn.com/2002/TRAVEL/DESTINATIONS/08/13/ep.elvis.eateries/ - 28k
         - Cached - Similar pages -

Fried Peanut Butter And Banana Sandwiches | HistoryofElvis.com
         Celebrate Elvis Presley's birthday Thursday with fried peanut butter and banana
         sandwiches and other Southern dishes The King loved. ...
         www.historyofelvis.com/tag/fried-peanut-butter-and-banana-sandwiches/ - 37k -
         Cached - Similar pages -

Fool's Gold Loaf - Wikipedia, the free encyclopedia
         Fool's Gold Loaf is a sandwich...fried with one jar of creamy peanut butter, banana,
         and a pound of bacon...Elvis Presley was at his home Graceland...
         en.wikipedia.org/wiki/Fool's_Gold_Loaf - 24k - Cached - Similar pages -

1 2 3 4 5 6 7 8 9 10    Next
```

```
┌─────────────────────────────────────────────────────────────────┐
│ [michael jordan computer    ]  [Search]                         │
│ Web  People  Images    Results 1 - 10 of about 2,590,000 for michael jordan computer  (0.38 seconds) │
│                                                                 │
│         705                                                     │
│   710  Michael Jordan    Results for Michael Jordan             │
│        Computer scientist; professor                            │
│                                                                 │
│   720  Michael Jordan | EECS at UC Berkeley                     │
│        Michael Jordan is Professor in the Department of Electrical Engineering and Computer │
│        Science and the Department of Statistics at the University of ... │
│        www.eecs.berkeley.edu/Faculty/Homepages/jordan.html - 11k - Cached - Similar pages │
│                                                                 │
│        Computer Science 294. Practical Machine Learning.        │
│        Prof. Michael Jordan Monday 4:00-6:00 PM, Tan Hall 180. Office hours for the lecturer │
│        of the week: ...                                         │
│        www.cs.berkeley.edu/~asimma/294-fall06/ - 14k - Cached - Similar pages - │
│                                                                 │
│   715  Michael Jordan    Results for Michael Jordan             │
│        Former professional basketball player                    │
│                                                                 │
│   725  Michael Jordan Computer Accessories, Micheal Jordan Computer ... │
│        Find the Largest Selection of Licensed Michael Jordan Computer Accessories │
│        including Michael Jordan Books, Videos, and DVDs and other Micheal Jordan ... │
│        fangear.chron.com/Chicago-Bulls-Michael-Jordan-Computer-Accessories-Home- │
│        Accessories_-1826524607_PG.html - 71k - Cached - Similar pages - │
│                                                                 │
│        Michael Jordan in Flight download - Michael Jordan in Flight ... │
│        Download Michael Jordan in Flight (Sport game) and play it on your pc. Michael │
│        Jordan in Flight is a computer game produced by Electronic Arts in 1992. │
│        www.squakenet.com/computer_games/download.asp?game=4164&title=Michael- │
│        Jordan-in-Flight - 14k - Cached - Similar pages -        │
└─────────────────────────────────────────────────────────────────┘
```

FIG. 7

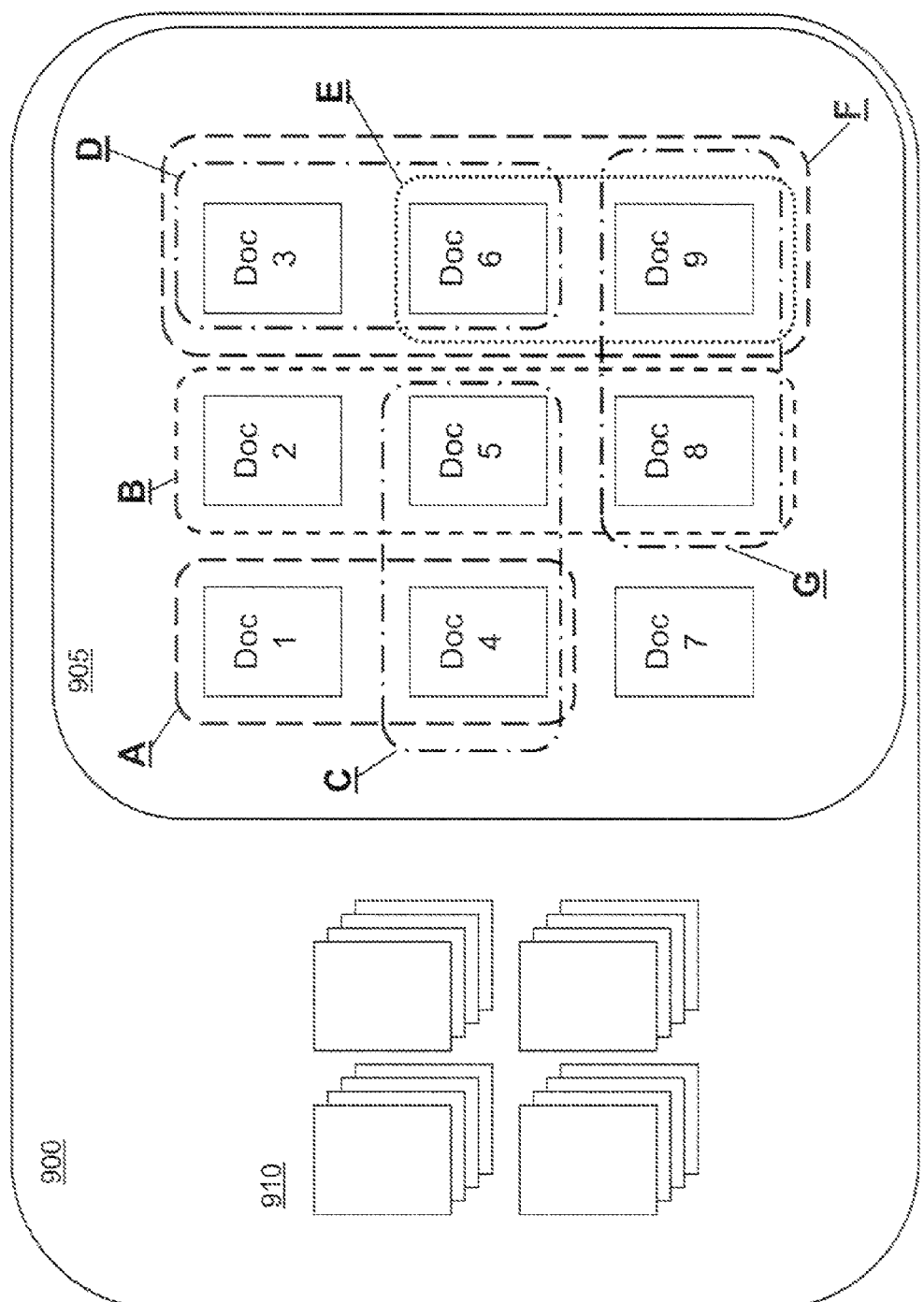

1000

| Term | Apperances | TF | INF | Total | Qualify? |
|---|---|---|---|---|---|
| Toronto Canada | 152,000,000 | 304,000.0 | 0.1 | 30,400.0 | NO |
| johndoe1435@example.com | 85 | 0.2 | 0.95 | 0.2 | YES |
| Crozet Virginia | 1,030,000 | 2,060.0 | 0.15 | 309.0 | YES |
| Jarmans Gap Road | 79,900 | 159.8 | 0.78 | 124.6 | YES |
| Vice Provost | 45,600 | 91.2 | 0.94 | 85.7 | YES |
| Molten Corporation | 51,900 | 103.8 | 0.21 | 21.8 | YES |

| Record | Term | Resource | Name | Prox |
|---|---|---|---|---|
| 1 | Jarmans Gap Road | www.domain1.com/page | John Doe | 4 |
| 2 | Jarmans Gap Road | www.domain1.com/page | Joe Schmo | 8 |
| 3 | Jarmans Gap Road | www.domain2.com/page | John Doe | 6 |
| 4 | Jarmans Gap Road | www.domain1.com/page2 | Joe Schmo | 12 |
| 5 | Jarmans Gap Road | www.domain3.com/page | John Doe | 3 |
| 6 | Jarmans Gap Road | www.domain3.com/page | Jane Doe | 4 |
| 7 | Crozet Virginia | www.domain3.com/page | Jane Doe | 4 |
| 8 | Crozet Virginia | www.domain2.com/page | John Doe | 2 |
| 9 | Crozet Virginia | www.domain1.com/page | John Doe | 15 |
| 10 | Crozet Virginia | www.domain1.com/page2 | Joe Schmo | 8 |
| 11 | johndoe1435@example.com | www.domain5.com/page | John Doe | 5 |
| 12 | johndoe1435@example.com | www.domain6.com/page | John Doe | 13 |
| 13 | Vice Povost | www.domain5.com/page | John Doe | 17 |
| 14 | Vice Povost | www.domain7.com/page | John Doe | 1 |
| 15 | Vice Povost | www.domain7.com/page | John Doe | 1 |

FIG. 10B

CONTEXT-BASED PERSON SEARCH

BACKGROUND

This specification relates to searches of network-accessible resources that include references to named people.

Search engines allow users to search Internet resources. Search engines can help users gather information about people, both real and fictional. For instance, users can enter a person name, i.e., a name of a person, or portions of a name, as part of a search query. Existing search engines can return search results, including listings of resources, satisfying the search. Depending on the search algorithms employed by the search engine, resources identified in the set of search results can each include mention of the person name somewhere in the resource. Search engines generally include a link to each resource included in the search results to read allow the user to access the resource to determine whether and how the resource pertains to the person.

Some search engines allow users to sort search results in interesting ways. For example, some search engines return listings of images, videos, and maps identified as being responsive to a particular search query. Some search engines are dedicated to searching for resources of a particular type or searching narrowly-focused databases or resource sets. For example, some search engines include online person directories, such as whitepages.com or people.yahoo.com, that allow users to search an established directory of names, addresses, and phone numbers. For instance, a user can enter a person name to retrieve the address and phone number of the person from the directory. Address directories can also be searched in reverse, with the user entering an address or phone number stored in the directory to retrieve the name of a person recorded as having that address or phone number. The accuracy and scope of such people searches are limited, however, by how often the directory is updated as well as by the breadth of the address or phone directory used by the search engine.

SUMMARY

This specification describes technologies relating to identifying distinct person identities of individual person names within a set of person names identified as associated with digital resources returned in a search.

In general, one aspect of the subject matter described in this specification can be embodied in methods that include the actions of generating, by operation of a computer system, a plurality of classification clusters, each classification cluster including one or more resources in a set of resources, each classification cluster corresponding to one or more classification terms, wherein each of the resources in a classification cluster includes at least one of the classification terms to which the classification cluster corresponds. Person names can be identified in the set of resources. At least on one person identity can be defined corresponding to each person name, including defining at least two or more person identities corresponding to one particular person name. Person identities associated with each classification cluster can be identified. Defining the at least two person identities corresponding to the particular person name can be based on associations of the corresponding particular person name with at least two different classification clusters. Resources associated with each person identity can be identified based on the resources in the classification clusters associated with the person identity. Other embodiments of this aspect include corresponding systems, apparatus, and computer programs recorded on computer storage devices, each configured to perform the operations of the methods.

These and other embodiments can each optionally include one or more of the following features, alone or in combination. A search query can be received and a set of search results generated adapted for presentation on a user interface. The set of search results can include a listing of person names and a listing, for each person name, of resources associated with one of the person identities corresponding to the person name. Each resource in the set of resources can include a first person name. The set of search results can include a first listing corresponding to the particular person name for a first person identity corresponding to the particular person name, and a second listing corresponding to the particular person name for a second person identity corresponding to the particular person name. A selection of the first person identity presented in the listing can be received, and a listing of resources associated with the first person identity can be presented in response to the selection, wherein the listing of resources includes hyperlinks to each of the resources in the listing. The classification terms can be selected according to a relative uniqueness of each classification term in the set of electronic documents. Each classification cluster can be identified based on an identification of relationships between classification terms in the set of electronic documents. Identifying person names associated with each classification cluster can include identifying a person name in a document within a predetermined proximity of a classification term corresponding to the classification cluster. The set of classification terms for at least one of the clusters can include a single classification term. Defining a person identity can include assigning a score to each occurrence of the person name substantially in proximity to a classification term, wherein higher scores are assigned to occurrences involving the classification term in closer proximity to the person name. Person names can be identified based on expected characteristics of person names.

Another aspect of the subject matter described in this specification can be embodied in methods that include the actions of identifying a plurality of classification terms in a set of resources and storing each classification term in a record of an index, each record including identification of at least one resource that includes the classification term. A first person name can be identified as included in the set of resources. The index can be used to identify, in resources including the first person name, at least a first classification term and a second classification term. A first person identity can be defined for the first person name based at least in part on the first classification term. A second person identity can be defined for the second person name based at least in part on the second classification term.

These and other embodiments can each optionally include one or more of the following features, alone or in combination. The index can be used to identify a first cluster of resources in the subset of resources including both the person name and the first classification term. The index can be further used to identify a second cluster of resources in the subset of resources including both the person name and the second classification term. The indication of at least two person identities identified for the first person name can include a listing of the at least two person identities. Defining a first person identity for the first person name based at least in part on the first classification term can be further based at least on part on whether the first person name appears within a predefined proximity of the first classification term in a resource. Identifying classification terms in a resource can include identifying words in at least one predefined category of words. The at least one predefined category of words can includes at least one of email address, URL, geographical name, or title. Each resource in the set can include text. A subset of resources can be identified in the set of resources satisfying a search query, the subset of resources including the first person name. An indication of at least two person identities identified for the first person name can be presented, on a user interface, in response to the search query.

Implementations may include systems, methods, software products, and machine-readable media storing instructions for causing data processing apparatus to perform operations. The details of one or more implementations are set forth in the accompanying drawings and the description below. Other features will be apparent from the description and drawings, and from the claims.

DESCRIPTION OF DRAWINGS

FIG. 2A is a screenshot of a first example listing of person names generated in response to a search query.

FIG. 2B is a screenshot of a listing of search results sorted by a person name included in the example listing of person names in FIG. 2A.

FIG. 2C is a screenshot of a second example listing of person names generated in response to a search query.

FIG. 3 is a flow diagram illustrating an example technique for generating a listing of person names in response to a search query.

FIG. 4 is a table showing selected records in an example name index.

FIG. 6A is a first table showing an example selection of person names for inclusion in a listing generated in response to a search query.

FIG. 6B is a second table showing an example selection of person names for inclusion in a listing generated in response to a search query.

FIG. 6C is a screenshot of an example listing of person names generated in response to a search query.

FIG. 6D is a screenshot of a listing of search results sorted by a person name included the example listing of person names in FIG. 6C.

FIG. 7 is a screenshot of an example listing of person names including a listing of person identities associated with one of the person names in the listing of person names.

FIG. 9B is a schematic representation of a second example set of digital resources and corresponding classification clusters.

FIG. 10A is a table showing an example selection of classification terms for use in building classification clusters.

FIG. 10B is a table showing selected records in an example term index.

Like reference symbols in the various drawings indicate like elements.

DETAILED DESCRIPTION

In response to a search query entered by a user, a search engine can generate a listing of person names for the search query. This listing of person names can be presented to a user instead of, or in addition to, a list of digital resources typically returned in response to a search query. This listing of names can convey to the user those person names most closely associated with the search query. Such a listing can be generated in response to any search term entered by a user or system, including a name of a real or fictional person, work of art, city, company, profession, or product. This list of names can be generated, for example, from a list of digital resources, e.g., web pages or other online files, satisfying the search query. Instances of person names can be identified in the returned resources for use in constructing a listing of names relating to the search query. For example, person names appearing more frequently in the returned resources, or appearing in those resources designated most relevant to the search query, can be selected and presented to the user in response to the search. Additionally, disambiguated person identities can also be identified for a person name returned in a search and presented to a user. Also, in some instances, the presence of person names in digital resources on a network can be detected and the names can be indexed in advance of the search, allowing for the list of names to be generated more quickly, decreasing the search latency experienced by the user. In various implementations, the name index may be separate from a word and/or phrase index or may be included in one or more word or phrase indices along with a designation of which terms are likely names.

Figure 1:
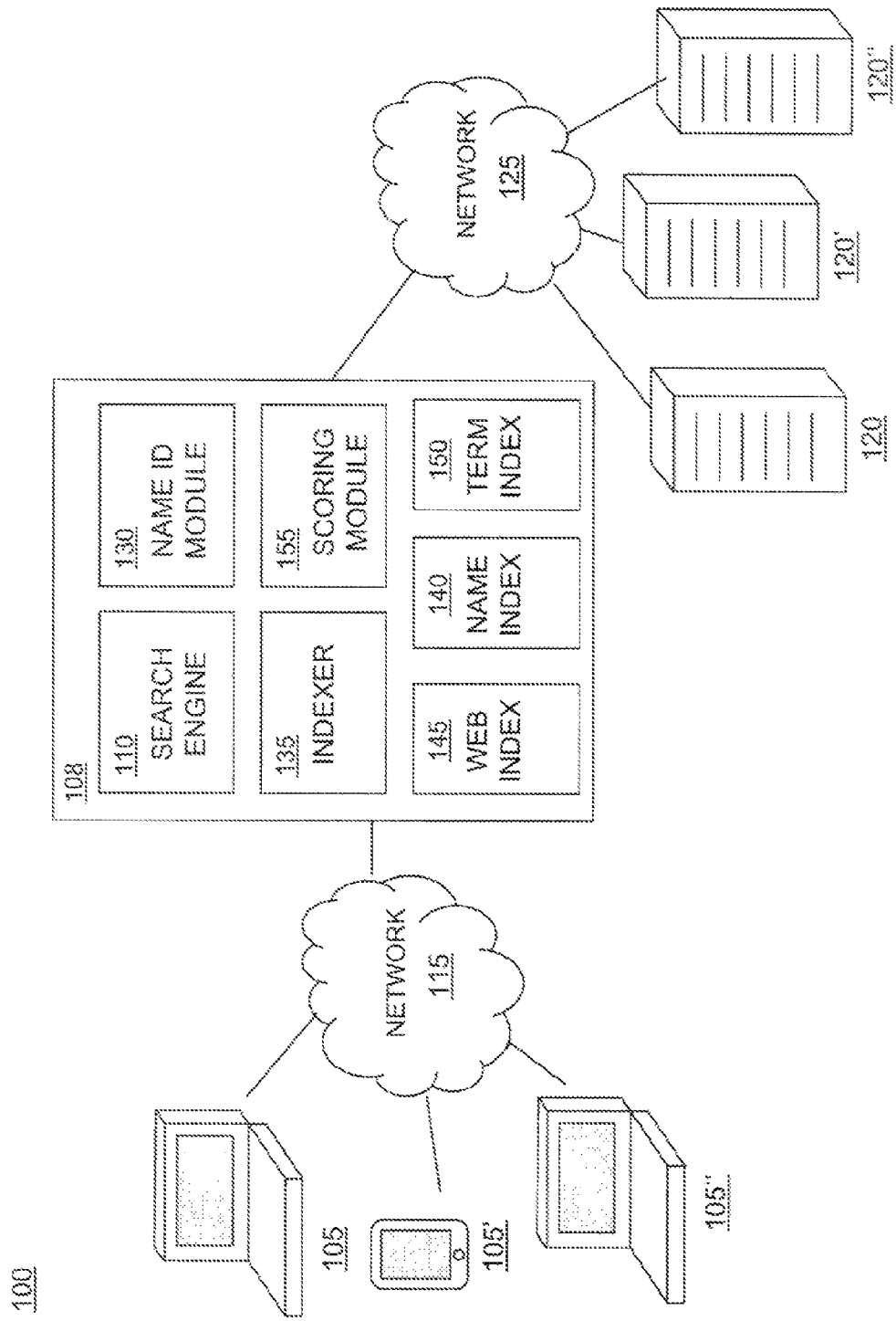
FIG. 1 is a schematic diagram of an example system for generating a listing of person names in response to a search query.

FIG. 1 is a schematic diagram of an example system 100 for generating a listing of person names in response to a search query. One or more user computer devices 105, 105', 105" can access a search system 108 including a search engine 110 over a network 115. The search engine 110 can search resources, hosted by servers 120, 120', 120" over network 125. In some instances, the networks 115, 125 can be same or include common parts, for instance, when the network 115, 125 is the Internet. Resources can be files, documents, images, web pages, panels, data objects, or other data stored so as to be addressable by a computer on the network.

The search engine 110 can access a name identification module 130 capable of detecting textual names included in or otherwise associated with a resource. Names may be contained in the textual content of a resource and/or in tags or other metadata that are associated with a resource. For instance, a resource whose content does not contain searchable text, such as an image, audio, or video file, will often include textual tags or metadata that can be accessed by a search engine. The name identification module 130 can be a software module implemented in one or more servers of the search system 108 and programmed to identify person names (or likely person names) in digital resources. An indexer 135 can be used to associate person names identified in a set of searchable resources with the resource in which each person name is found. In some instances, the indexer can create one or more indexes 140 of all instances of person names found in a set of searchable resources, together with an identification of the resources where each instance of a person name was found. In some implementations, the indexer 135 can include one or more web crawlers capable of building additional indexes, such as web indexes 145, for use by the search engine 110 in identifying resources satisfying a search query, as well as term indexes 150 for use in disambiguating names.

In some implementations, a scoring module 155 can be used to determine which of the identified person names should be displayed to a user in response to a given search query. The scoring module can, for example, assign scores to each instance of a person name appearing in a set of resources returned in response to a search query. Scores can be based on the frequency of a person name's appearance in one more resources, the quality or relevance of a resource in which an instance of a person name appears, the context in which the person name appears, as well as the proximity of a person name to other terms found in the resource, e.g., terms in the search query appearing in the resource. The scoring module can cumulate the scores for each unique person name, based, for example, on the scores assigned to each instance of each person name, to develop a ranking of person names appearing in the set of returned search results. Rankings or scores can be used, for example, by the search engine 110 to generate a listing of names for display to the user in response to the search. The listing of person names can also include a listing of resources associated with each person name, e.g., resources satisfying the search query and that include the particular person name.

FIG. 2A is a screenshot 200a of a first example listing 205 of person names generated in response to a search query 210. Here, the user has specified that a listing of person names 205 be returned in response to the query 210, through the selection of a user interface control 215, designating a "People" search. The user entered "lakers" as a search query 210 and the system has returned a listing of person names 205 including the names "Kobe Bryant" 220, "Phil Jackson" 230, "Magic Johnson" 225, and "Pau Gasol" 235. In this example, the names 220, 225, 230, 235 are followed by corresponding search result listings 240, 245, 250, 255 of resources returned for the search term "lakers" that also include a reference to the respective names 220, 225, 230, 235. The names in the listing 205 are those names determined by the search system 108 to be the most relevant for the search term "lakers." The resources listed under each of the names in the listing 205 can be those resources most pertinent to the respective name, resources most relevant to the search term that also contain or reference the respective name, or resources otherwise identified as being most likely of interest or useful to the user.

Each of the names in the listing 205 can be hyperlinked to the search system so that when they are selected the search system performs a search using the person name as a search term and/or filters the present search results. For example, clicking "Pau Gasol" can cause the system to filter the resources returned for "lakers" and to return a listing 260, as shown in the example screenshot 200b of FIG. 2B, including only those resources containing a reference to "Pau Gasol." Additionally, in some implementations, the listing 260 can be re-sorted to first display those resources returned for "lakers" that are determined most relevant to "Pau Gasol." Selecting resources displayed in a resource listing (e.g., using a mouse click) can result in the retrieval of the selected resource itself.

In addition having a list of relevant person names for a search query can allow a user to quickly find an answer to a question using the search engine without selecting, accessing, or reading any of the actual resources returned by the search engine. For instance, as shown in the example screenshot 200c in FIG. 2C, a user is seeking the name of the current CEO of Krispy Kreme Doughnuts. The user has entered the search term 210 "krispy kreme ceo" and indicated 215 that the returned search results are to be organized according to associated person names. The resulting listing 205 returns three names "James Morgan," "Vernon Rudolph," and "Daryl Brewster." Looking at the resource listings 240, 245, 250 organized beneath each of the person names, the user can see that James Morgan is the present CEO. Indeed, in some implementations, in addition to pulling a recurring person name from the text of the resources, the search engine system can also identify a recurring or trusted description of the person associated with the person name. As shown in FIGS. 2A and 2C, short descriptions (e.g., the description 265 corresponding to the name 220 "Kobe Bryant" in FIG. 2A) have been generated for each of the person names in the example listings, as extracted from and/or corroborated by text appearing in resources returned for the search. For instance, in the example of FIG. 2C, the description 270 associated with "James Morgan" indicates that James Morgan is the current CEO of Krispy Kreme. As a result, in this example, the name listing 205 generated from the search has allowed the user to conveniently find the desired answer without the user needing to select or directly access any of the resources returned in the search. Additionally, the resource listings 240, 245, 250, displayed in conjunction with the name, allow the user to quickly find resources that support or provide information supplementing the answer.

FIG. 3 is a flow diagram 300 illustrating an example technique for generating a listing of person names in response to a search query. For example, the technique can be used to generate the listings illustrated in the screenshots of FIGS. 2A-2C. A search query for use in performing a query by a search engine is received 305. The search query may be entered by a human user or as an automated query submitted from a computing device, software application, or virtual machine. The search query can be received by a search engine and is used to identify 310 a set of resources satisfying the query. The search engine can search the indexed content of the resources for the term or terms included in the search query, or other words associated with terms in the search query (e.g., synonyms). The search engine can also identify resources based on metadata, tags, or other textual data associated with terms in the search query.

Person names are identified 315 within the identified set of resources. Person names can be indexed in advance of the search query by a back-end indexer or the resources can be searched to identify likely person names after identifying the resources in response to the search query. Identifying person names in the resources can also include searching resources that include text, graphic, video, or audio content for words that can potentially be person names. For instance, a full-text search can be performed of a resource for the identification of potential person names. As another example, a speech recognition module can be used to identify words in audio file resources that can further be identified as person names included in the audio file. Upon identifying person names in the set of resources, a subset of the identified person names can be selected 320 based on predetermined selection criteria or a predetermined selection algorithm. For example, each person name identified in the set of resources can be scored to determine which person names are more closely associated with the search query. The selection criteria or algorithm can be based, for example, on the frequency of a name's appearance in one or more resources in the set of resources, the percentage of those resources containing the name, the proximity of the person name in the text to other words associated with a search term, or the appearance of a name in resources determined to be most relevant for the particular search. Once a subset of person names 320 associated with the identified set of resources is determined, a listing of the subset of person names can be generated 325 and prepared for presentation to the user.

Person names can be identified within resources. For instance, in a resource containing text, the text of the resource can be searched for known first and last names, as defined by an index or list of known first and last names. Such an index or list can be constructed in advance and contain any and all words known or likely to be used as first and/or last names. Additionally, in some implementations, algorithms can be employed that identify words or word pairings that likely constitute a person name. For instance, the alphabetic text of a resource can be scanned for words beginning with a capital letter. Some algorithms can further specify that at least one letter in the identified word also have at least one lower-case letter appearing after the capital letter. In some cases, the subset of words in the text beginning with a capitalized letter can then be compared against a list of known names to determine if the identified, capitalized word is a potential person name.

In some implementations, narrowing the number of words that will be compared against the list of known names to those words likely to be a name (e.g., words having a first capitalized letter) can expedite the process of identifying person names in the text, conserve system processing resources, as well as assist in making the determination that a word is a person name more accurate. For instance, some words can be mistaken as person names. For instance, words such as hunter, jack, and summer can exist both as informal nouns or verbs and person names. While identifying instances of words, for example, with a first capital letter, can help limit false positives, non-name uses of words, such as hunter, jack, and summer, can begin with a capitalized letter, such as when they appear at the beginning of sentence. Algorithms can be employed that further limit the words identified as potential person names. For instance, text of resources can be searched for two-word sets, each having capitalized first letters, with the words in the set near or adjacent to another in the text, as would be expected for a first and last name of a person (e.g., John Smith). The search may also be conducted for three-word or other sets, including initials, nicknames, and the like. The first word in the set could then be compared against known first names and the second word compared against known last names. While the name pair need not match a known first and last name combination, in some implementations, an additional index can be maintained of known first and last name combinations. Such an index could be useful, for example, for a person search system used in a private network where the names of persons accessing the network or appearing in the network's resources are limited, e.g., names of employees in a company controlling the private network.

Upon comparing identified potential person names in the text of resources, further operations can be performed to determine whether the identified names are likely person names. For instance, an identified potential person name may include words that are more often than not used as informal nouns or verbs rather than a person name. Names such as Apple or Peaches may be identified as potential person names, but may nonetheless present a higher risk for the return of a false positive than more common names such as Susan, Harold, or Paul. Accordingly, some listings of known person names may include likelihood values that each indicate the likelihood that the usage of a particular word is a person name. Calculating a probability that a particular instance of a word is a first or last name can also be based on the context within which the word appears in the text. For instance, the presence of a word in proximity to other words that normally indicate that a word is a person name can be considered, such as words used in a biographical description, titles, birth dates, and so on. Such words can be identified, for example, from a listing of words and word formats identified as likely relating to biographical information. Additionally, a scoring module can measure the presence of a potential name multiple times in a single resource, as would be expected for resources describing a person. For instance, the name of basketball player Magic Johnson may appear initially as "Magic Johnson" in a resource, and then multiple times thereafter simply as "Magic." The word "magic," in isolation, may be determined to most likely not be a person name. However, in that the word "Magic" appears capitalized and adjacent to a known last name "Johnson," a name-identifying algorithm may flag the word "magic" as potentially a person name. Indeed, the algorithm may then recognize that each or a substantial plurality of the references to "Magic" in the reference are also capitalized. As a result, a name identifier module can conclude that the use of the word "Magic" in this resource, including each of the capitalized instances of the word, is a person name.

Like the Magic Johnson example above, a name identification module can identify multiple instances of a person name within a single resource and determine that each of the instances refer to the same person name. For instance, the name "Earvin Magic Johnson" can be identified, with other references to "Earvin Johnson," "Magic Johnson," "Johnson," "Magic," and "Earvin" identified as instances of the same "Earvin Magic Johnson" person name. These alternative references can be within the same resource or across different resources, and identified and grouped under the same person name by the name identification module. Common nicknames or short forms of a name can also be automatically identified by the name identification module and associated with a previously-identified person name. For instance, references to Robert Kennedy could include use of the names "Bob," "Rob," or "Bobby." Known short forms of a name could be associatively stored in an index or database containing listings of known names. Determining that two different names (e.g., Bob and Robert) are instances of the same person name can be based on a reading of a known name index indicating whether the identified names are related versions of the same name. A determination that two distinct names are alternative versions of the same name can be further based on a determined probability that the names are potentially the same. Consider an example where resources contain the names of both "Bob Dole" and "Robert Byrd." In such an instance, a name identification module can determine that subsequent references to "Bob" and "Robert" in these resources should not be considered instances of the same person name, but instead references to "Bob Dole" and "Robert Byrd."

Determining the probability that a word or set of words is a person name, or the same person name, can be based on a name index compiling each known reference of an identified, potential first or last name in any of the resources known to a search engine or web crawler. Such a name index can be compiled in a manner similar to the construction of a web index. Indeed, in some implementations, a web crawler can build and maintain both a name index and a web index. For example, as a web crawler trolls a network and reads and caches new or updated resource text, person name instances can also be identified in the resource and stored in the name index. In some instances, the name index can be built by referencing resource text cached by the web crawler in an associated web index, in lieu of crawling resources already scanned and cached by the web crawler. For instance, in a web index caching the text content of a set of known resources, the cached text of each resource can be searched for instances of person names to build or supplement a name index.

FIG. 4 is a table showing selected records in an example name index 400a. The index 400a can be used to identify person names contained in a given resource. The example illustrated in FIG. 4 is a simplified representation of a name index. In some applications, name indexes can be built that store large numbers of records pertaining to the associations of identified names with digital resources on a network. In this example, all known network resources 405 are assigned a resource ID 410. The text data of each resource is scanned for names appearing in the text. In this example, name index 400*a* contains the identified person names 415 contained in each resource and the word or phrase 420 identified as corresponding to the person names. In some instances, short form versions of the name have been identified as corresponding to the person names 415 (e.g., "Abe" for "Abraham Lincoln"), while in other instances the corresponding phrase 420 is identical to the person name 415. In still other examples, reverse indexes can be built to supplement or in lieu of a "forward" index, such as illustrated in FIG. 4. A reverse index can use person names as the primary key, associating a listing of resources containing an instance of the person name with the person name.

In one example, illustrated in FIG. 4, a webpage resource at URL "www.virginia.edu/about" includes three person names that have been identified in the resource using a name identification module. Here, the names "Thomas Jefferson" and "Martha Jefferson" have been identified. Other words may have been identified as potential names in the resource, failing however to meet the name identification module's standards for inclusion in the index 400*a*. This index 400*a* can be used, for example, when a resource is identified as satisfying a particular search query. A name index 400*a* can be consulted to quickly identify person names that are included in a resource, together with the number of instances of each person name in the reference (e.g., two references to "Martha Jefferson," one being the first name "Martha" in isolation). Additionally, in some implementations of the name index 400*a*, a location identifier can be included to specify where each instance of a person name appears in the resource text. A location identifier can be used, for example, to determine the proximity of a person name to other terms in the resource, for example, terms related to a particular search query or another instance of a person name. A location identifier can also identify person names appearing earlier in a resource, or in the title or URL of a resource, allowing such factors to be considered in building a person name listing (e.g., for a particular search request).

While using a pre-constructed name index, such as shown in FIG. 4, can help make the identification of person names within a set of resources more efficient, other techniques can also be employed to develop a set of person names identified as existing in a set of resources. For example, scanning a resource for person names can take place on a piecemeal basis, with resources being scanned only after being identified as a result in a search. Identifying person names in a result set can be limited to only the top hits for a given search. Further, in other examples, a hybrid approach can be implemented by caching or indexing identified person names on a resource-by-resource basis only for resources that are identified in a person search. Such an approach can help to limit the universe of resources that are actually scanned for person names to those resources that have a history of being returned as results (or top-ranked results) in a query.

Figure 5A:
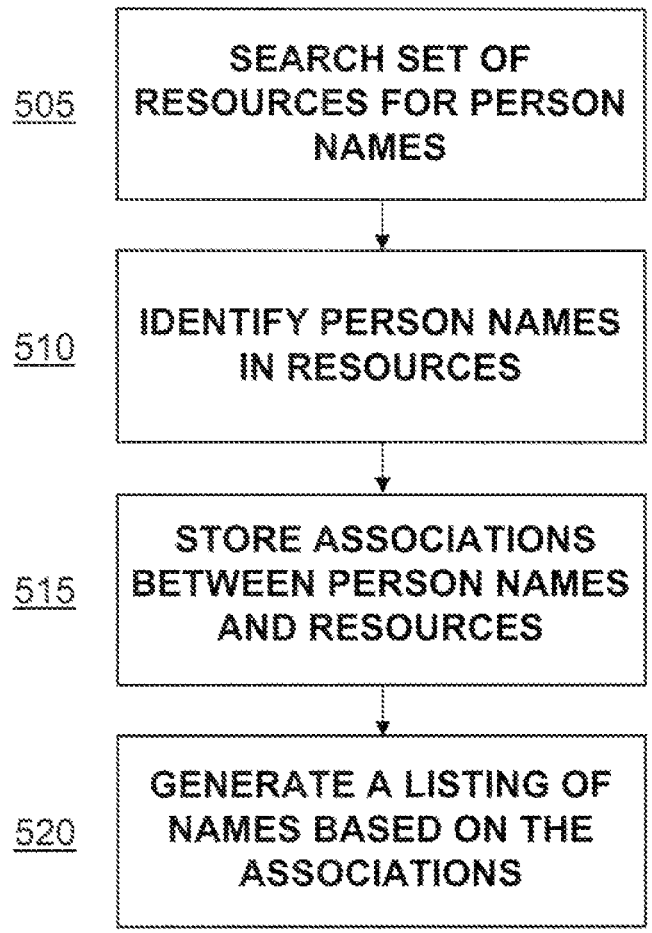
FIG. 5A is a flow diagram illustrating an example technique for building a name index.

FIG. 5A is a flow diagram 500*a* illustrating an example technique for building a name index. A set of resources on a network is searched 505 for potential person names included in the resources. The set of resources can be systematically scanned, for example, using a web crawler running continuously or at some other preconfigured interval. In other instances, resources can be scanned for person names in response to an event (e.g., identifying a resource as a frequently accessed search result). Scanning the resources can yield the identification 510 of at least one person name in at least one of the resources in the set. Upon identifying a person name, an association can be established between the person name and the resource in which it appears and the association can be stored 515 in a name index. For instance, a given person name can be associated with the name, URL, or other identifier of the associated resource, and the person name or the resource identifier can serve as the primary key in the name index. The name index can be accessed and used, for example, by a search engine or other application, to generate 520 a listing of names based on the stored associations. For instance, a name index can be accessed and used for a variety of operations including determining what names appear in a set of resources returned in a search, calculating the probability that a word is a person name, identifying names that appear in a set of search results, and determining a score for a particular name in a resource. A name listing can be generated 520, for example, in response to a search engine query.

Depending on the nature of the data in the resources and the scope and requirements for accuracy in determining the presence of person names in the set of resources, a number of algorithms can be employed by the name identification module to identify words in a resource and categorize the words as a person name.

Figure 5B:
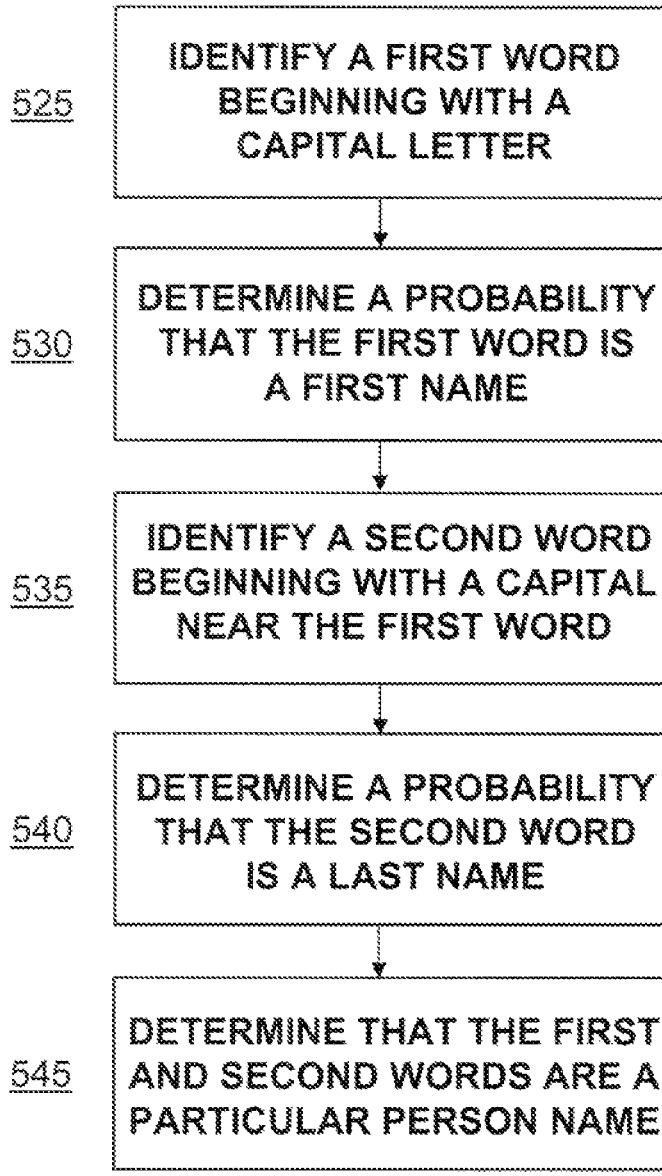
FIG. 5B is a flow diagram illustrating an example technique for identifying person names in a digital resource.

FIG. 5B is a flow diagram illustrating an example technique for identifying person names in a digital resource. In the example shown in the flow diagram 500*b* of FIG. 5B, identifying a person name in a resource can include identifying 525 words appearing in the resource that begin with a capitalized letter. Upon identifying 525 a first word, a probability can be determined 530 that the first word is or is not a person name. Specifically, in some instances, the determination 530 can be directed to the probability of whether a word is a first or middle name or a last name. For example, a probability can be determined that the first identified word is a first name.

Because person names are often introduced as a full name including a first and last name, the resource can be further analyzed to identify 535 a second word beginning with a capitalized letter and substantially in proximity to the identified first word. Words having the requisite proximity of a qualifying second word can be those appearing immediately adjacent to the first word or within a predetermined number of words or characters from the first word. The required proximity of the second word can be based on a known or determined probability that the second word is a second name within a person name also including the identified first word. Additionally, the second word can appear before or after the first word within the resource, in that person names sometimes appear with last name listed first. Upon identifying 535 the second potential name, a probability can be determined 540 relating to whether the second word is a name. For instance, as with the determined probability 530 of a first word, the probability determined for the second word can be specifically directed to a type of name, for example, the probability that the second word is a last name.

Having identified first and second words and determining the probability that each respective word is a name in a person name, a probability can be determined 545 that the first and second words, together, are the name of a single person. For example, the first name can be the first name and the second name the last name of a person. More than two names can be identified as well, such as the first, middle, and last name of a person. Determining 545 that the first and second words belong together as portions of a single person name can be based, for example, on the combined probabilities determined 530, 540 for each name or the proximity of the first word to the second word. Additional criteria or scoring can be employed to make the determination 545, including consulting a pre-constructed list of known person names or scanning the resources for multiple instances of the first and second word used together or within close proximity. Criteria employed to determine that two or more words relate to a single person name may additionally require that a score or combined probability that the words are a person name exceed a particular threshold, to eliminate storing in the index likely false positives. Upon determining 545 that the words are sufficiently likely to be a person name, the person name can be stored in the name index.

An identified person name can further serve as the basis for identifying derivative instances of the determined person name also included in the resource. Derivative instances of a determined person name can include the first or last name in isolation, as well as short-form versions of one of the first, middle, or last names, such as an initial or common short-form name (e.g., Bob for Robert). Identified instances of the same person name can be further processed to ensure that they meet any threshold standards for reliability, and then stored in the name index as an instance of a previously-identified person name also identified in the resource.

Techniques described in connection with FIG. 5B can be applied in other name identification contexts. For instance, a set of audio resources can be analyzed for the presence of words or word pairings known to potentially be parts of a person name. Image or graphic data in a resource can also be processed and then scanned for words attributable to the patterns that are likely parts of a person name. Probabilities can be determined for audio and graphic data segments identified as potential names, to determine whether the data segments are sufficiently likely to be references to a person name. The threshold probability requirement, for a data segment identified as a potential name, may vary depending on the data type. For instance, determining with sufficient accuracy that characters in text data are a person name may be considered a more reliable process than recognizing names from speech or other audio data. Such differences can serve as the basis for probability calculations and thresholds being adjusted based on the type of data being scanned. Additionally, in resources containing multimedia, for example, both images and text, names can be identified and determined from multiple data types appearing in a resource. Additionally, instances of an earlier determined person name (e.g., a full name identified in the text of a web page) can be identified in other data objects within the same resource (e.g., a short form version of the full name appearing in an image in the same web page).

Criteria can be used to select whether to display all or only a limited number of person names identified in a set of search results (e.g., based on the number of names included in the search results) and which names to display. For instance, the number of displayed names can be limited to a set of 5, 10, or some other number. Additionally, user preference and session data can be consulted to predict whether particular names returned in the search are more likely to be relevant to a user (e.g., names determined to be relevant to a particular geographical location associated with the user, or user-specified favorites, such as musical genres, sports teams, hobbies, etc.).

In some instances, more complex criteria can be used or scores calculated to determine the relevance of each name to the search query, to limit the number of names that will be displayed to the user, or to rank the person names for display to a user. For example, a subset of person names can be selected having the most overall instances appearing within the resource result set. The selected subset can be limited, for example, to a fixed number or percentage of the total set of person names identified in the search result set or to only those names appearing with a certain frequency within the search result set. Other criteria can also be considered in weighing selection of a name for the subset. For instance, a name appearing several times within a single resource can be given more weight than a name appearing only once. Names appearing in closer proximity to other key terms within a resource can be given more weight. For instance, names can be favored that appear in the resource in close proximity to terms that are included in or related to the search query. The location of the name within a resource can also be considered. For instance, a name appearing in the title or URL of a resource or appearing nearer to the beginning of a resource can be given more weight.

In some instances, the resources returned in a set of search results can be scored based on the resources' respective relevance to the search query. In other instances, search engines can find certain domains or resources to be particularly reliable, and score these favored resources higher based on their reliable status.

The scores determined for a resource can be considered when selecting a subset of person names. For instance, names that appear in higher-scored resources can be given more weight. A name's appearance multiple times within a high-scored resource may be considered more meaningful or relevant than other names appearing less frequently or at different, less prominent locations within the resource. The subset of names considered for selection can be limited based on the score of the resources in which they appear. For instance, the set of names considered can be limited to those names appearing in resources with a respective score that exceeds a certain threshold.

FIGS. 6A and 6B are included for convenience in illustrating an example selection of person names for inclusion in a listing generated in response to a search query and need not be an actual table or data structure maintained by the system. In the example of FIG. 6A, a first table 600 includes resources 605 identified in response to a search query 610 "fried peanut butter banana." Included in the table 600, under each resource, are person names 615 identified in the resource using a person name identification module. The resources 605, in this example, each have a respective score 620. In this example, a score 620 can be calculated that considers variables including the overall frequency of appearance 625 in the resource (or number of times a name appears within the resource), the frequency 630 with which the name appears in close proximity to a term included in the search query (in this example, the number of name appearances within twenty words of a search term), as well as whether the name appears in the title of the resource 632. These variables 625, 630, 632 can be assigned the same or different weights. Additionally, appearances within a higher ranked resource can be given a higher weight. Accordingly, the score 620 can also be determined according to each resource's determined relevance to the search query 610 or each resource's document quality The resource's document quality can be determined independently of the search query 610. Not included in the table 600 are resources determined to be of less relevance.

FIG. 6B is a second table 635 showing an example selection of person names for inclusion in a listing generated in response to a search query. The second table 635 aggregates the resource scores 620 calculated for each identified person name 615 in the set of resources 605 shown in FIG. 6A. In this example, a total score 640 is calculated for each person name 615. To derive the total score 640, the sum 645 of all resource scores for the person name is considered together with the frequency 650 with which the person name appears within the set of resources (i.e., the percentage of resources in which the person name appears). Other variables can also be considered. In this example, the top five names are selected for inclusion in a listing of person names to be displayed for the search query based on the person names' respective total scores 640. The subset of names 655 included in the name listing are prepared for display to a user, for example, the user who initiated the original search.

FIG. 6C is a screenshot 660 of an example listing of person names 665 generated in response to a search query. In this example, the search query 610 is again "fried peanut butter banana." Beneath each person name in the listing 665 are resources are identified in which the person name is included. In this example, the resources displayed in the listing 665 are limited to the top resources considered in selecting person names for the listing, as described in reference to FIG. 6A. In other examples, additional resources, not considered during selection and scoring of the names, can be included. For instance, although "Paula Deen" only appeared in one resource considered in table 600 of FIG. 6A, her name may have appeared in several other resources returned for the set, but not considered during scoring. These additional, identified resources can also be included in the person name listing 665 to help supplement the name listing 665.

For person names appearing in many resources, it can be useful to limit the number of resources displayed in conjunction with the name. For instance, "Elvis Presley" appeared in seven of the considered resources, while only three of these resources appear in the listing 665. Resources selected for inclusion under a person name in the listing 665 can be selected using a variety of parameters and considerations. For instance, as in the example shown in FIG. 6C, the three resources 670 appearing with "Elvis Presley" 675 are the three highest-ranked resources in which Elvis' name appears, displayed in order of resource rank. In other examples, the resources displayed with Elvis can include and be ordered according to the relevance of the resources to the person name. Whereas the resource rank is focused on the relevance of the resource to the search query and/or the quality of the resource, determining a name-specific rank can be useful to focus attention on the person's connection to the subject matter of the query. For instance, a name-specific rank can be based on the number of person name references in the resource, the person name's resource score for that resource, or other considerations. In the example illustrated in FIG. 6C, resource 680 is not included with the "Elvis Presley" name in the example listing 665, having been ranked eighth for its relevance to the search query 610. In other examples, resource 680 may be selected for display with "Elvis Presley" in a name listing 665 over higher-ranked resources on the basis that the resource mentions "Elvis" more than twenty-five times. Indeed, in some examples, the name listing can include resources not considered during selection of person names for the listing, in lieu of names considered during selection of person names. For instance, while a Wikipedia reference to "Elvis Presley" may have made only passing reference to fried peanut butter and banana sandwiches, and thereby not have been included with the resources 605 considered in scoring the names 615 (e.g., to simplify and expedite scoring and selection of names for the listing), the dedicated Elvis Presley reference would likely provide far more information relating to the person (and far more instances of the person's name), than the top search results focused on a fried sandwich named in his honor.

A user can interact with the listing 665 displayed on a web browser interface, for example, and select one of the names in the listing 665 to filter the set of resources returned in the search. FIG. 6D is a screenshot of a listing of search results sorted by a person name included in the example listing of person names in FIG. 6C. As shown in FIG. 6D, a user can select the name "Elvis Presley" 675 to display a listing of resources both satisfying the search and including at least a derivative of the name "Elvis Presley." As with the display of resources 670 in the name listing 665 shown in FIG. 6C and discussed above, the resources 685 included in resource listing 680 can be limited to the resources considered in selecting names for the person name listing, can include all resources returned in the search, including resources not considered in selecting the name for the name listing 665, or can include some other subset of resource returned in the search. Additionally, the resource listing 680 can rank-order resources for display to the user according to the relevance of the resources to the search query, the relevance of the resources to the selected person name 668, or some combination of both. In some implementations, a user can select a basis 690, 695 by which to sort the resource listing 680, according to the user's preference. For example, a user can sort 690 the presented resource listing 680 to order the presented resources according to the relevance of the resources to the original query (e.g., in this example "fried peanut butter banana") or sort 695 the resource listing 680 to order the resources according to the resources' relevance to the identified person name or identity associated with the person name (e.g., "Elvis Presley").

In some instances, more than one person, or identity, can be associated with a single person name. For instance, a search query may result in a set of resources being identified from which the name "Michael Jordan" is identified. The name Michael Jordan may refer to the world famous basketball player or the well-known computer scientist at the University of California—Berkeley. Some of the instances of "Michael Jordan" in a set of returned search results may refer to the basketball player while some refer to the computer scientist. A listing of person names, generated in response to the search result, can be modified to show that multiple identities may be associated with "Michael Jordan," or any other person name associated with more than one person identity.

FIG. 7 is a screenshot of an example listing of person names including a listing of person identities associated with one of the person names in the listing of person names. As shown in the example screenshot 700 of FIG. 7, a listing 705 can show two separate listings, or disambiguations 710, 715, of "Michael Jordan" together with listings of resources 720, 725 associated with each disambiguation of the identified name.

Figure 8:
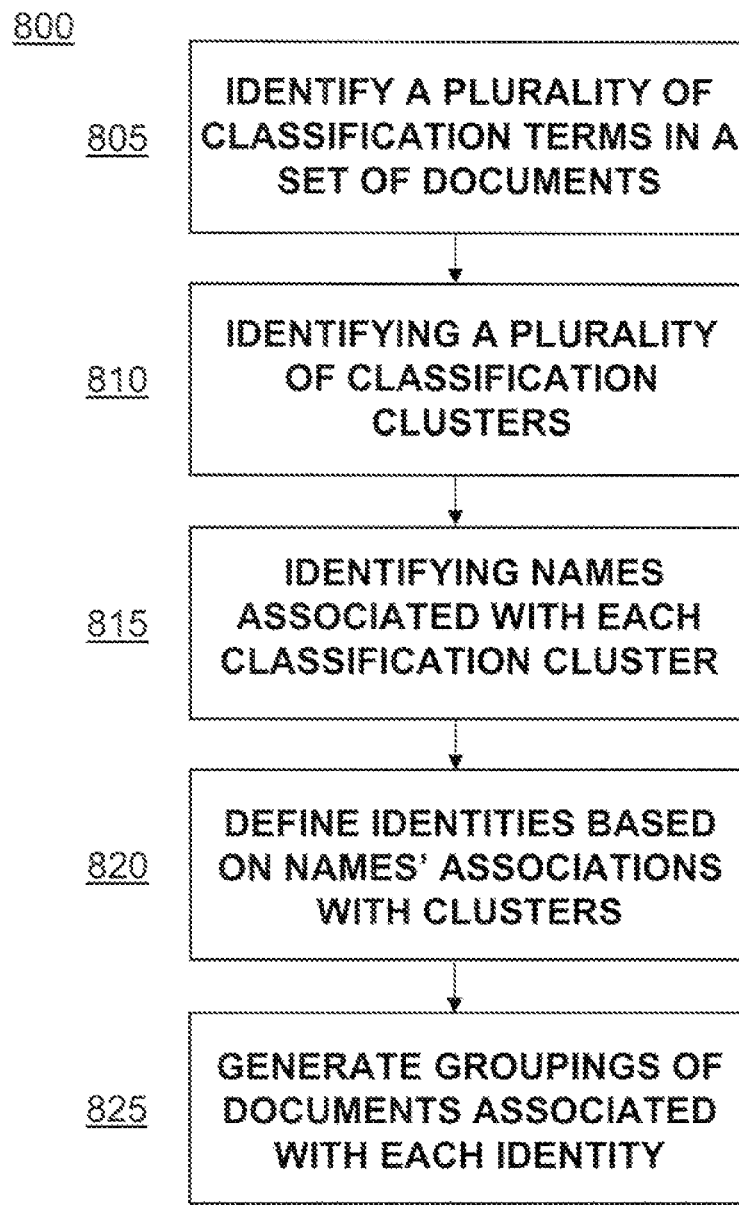
FIG. 8 is a flow diagram illustrating an example technique for defining person identities associated with a person name.

FIG. 8 is a flow diagram 800 illustrating an example technique for defining person identities associated with a person name. The illustrated technique can be used for disambiguation of an identified person name. Classification terms are identified 805 in a set of resources. A plurality of classification clusters are identified 810 from the identified classification terms; each classification cluster corresponds to a subset of the identified classification terms. In some instances, a cluster can also include a subset of the digital resources associated with terms in the cluster. For instance, resources included in the cluster can include those resources in which at least one of the classification terms in the classification cluster appears. Person names are also identified 815 as being associated with each of the classification clusters. Associated person names can include those person names identified as appearing within the resources included in the classification cluster. In some instances, person names can be associated with two or more person identities. Person identities associated with a particular name can be identified and defined 820 from the classification clusters associated with the name. Groupings of digital resources associated with each person identity are generated 825 according to the classification clusters associated with the person identity. Resources grouped according to person identity can be used to present disambiguated identities of a person name identified in a set of resources returned in a search, such as illustrated in the example of FIG. 7.

Figure 9A:
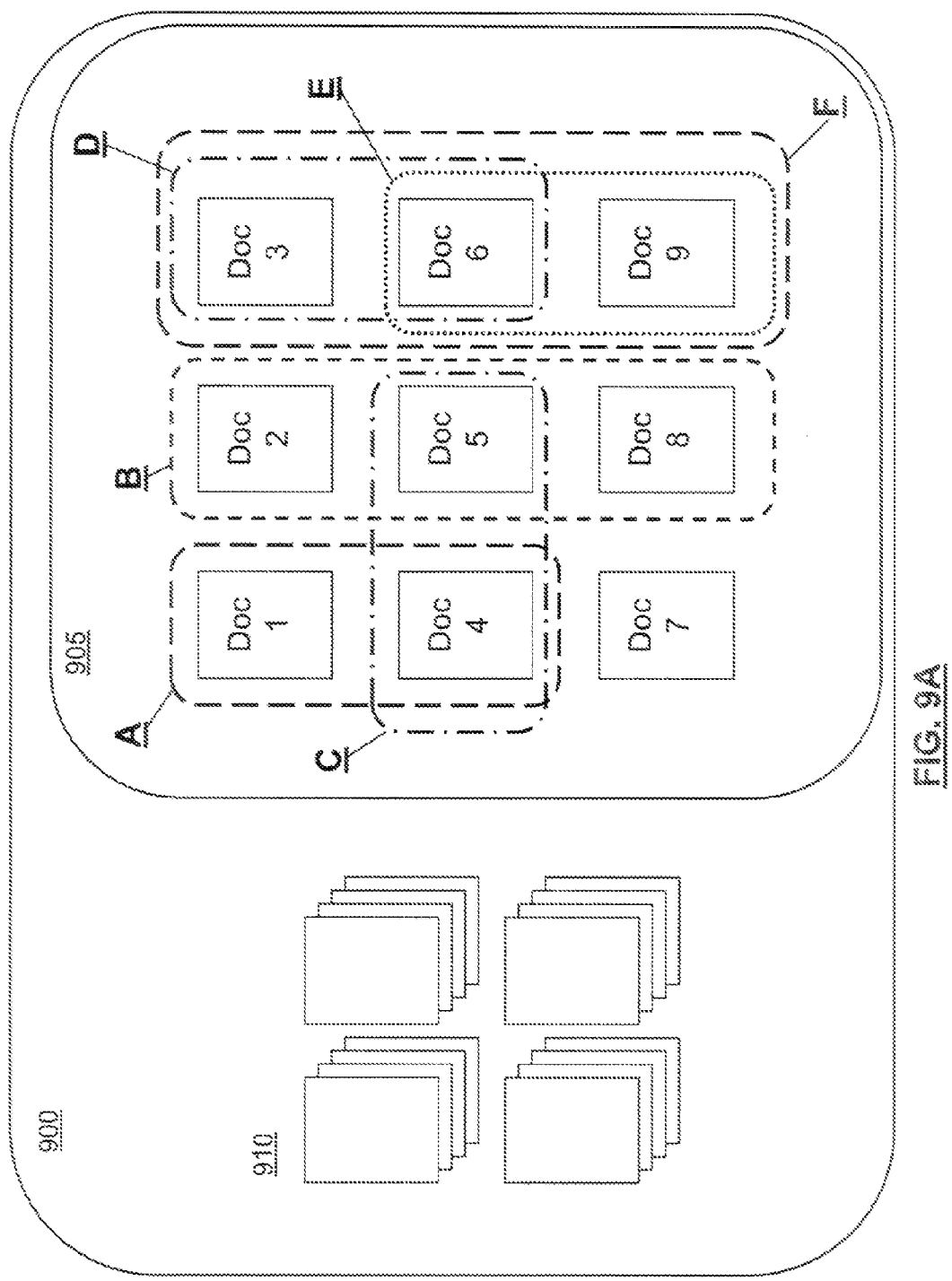
FIG. 9A is a schematic representation of a first example set of digital resources and corresponding classification clusters.

FIG. 9A is a schematic representation of a first example of a set 900 of digital resources and corresponding classification clusters. The set 900 can be, for example, every resource on a network, resources identified by a search engine in response to a search query, resources of a particular type or containing particular data, resources known to a search engine, or some other subset of digital resources on a network. In this particular example, a subset 905 of the set 900 of resources has been identified, containing references to "Michael Jordan." Additionally, classification terms have been identified in these resources 905 serving as the basis for grouping the resources 905 into clusters (in this case, clusters A-G). The remaining resources 910, in this example, do not contain references to "Michael Jordan" and are not clustered for purposes of identifying and defining person identities for this particular person name, although they belong to clusters determined for other person names.

Some resources in subset 905 are associated with more than one cluster. For example, Document 4 is associated with both clusters A and C. Resources belonging to more than one cluster can serve as an intersection between the clusters used to determine a relationship or connection between the clusters. In the example of FIG. 9A, intersections exist between clusters A and C (at Document 4), B and C (at Document 5), D and E (at Document 6), D and F (at Documents 3 and 6), and E and F (at Documents 6 and 9). On this basis, in some instances, it can be determined that a relationship exists between clusters A, B, and C and between clusters D, E, and F. These distinct groupings of clusters can serve as the basis for determining that two distinct identities exist for Michael Jordan, a first identity associated with clusters A, B, and C, and a second identity associated with clusters D, E, and F. Accordingly, in some instances, it can be determined that the resources associated with clusters A, B, and C (i.e., Documents 1, 2, 4, and 5) reference a first Michael Jordan and that resources in clusters D, E, and F reference a second, distinct Michael Jordan.

Classification clusters, such as the clusters in FIG. 9A, can be built based on classification terms appearing in the resources. A cluster can be formed of resources each containing a common classification term or a plurality of related classification terms. For instance, resources in cluster A, in the example of FIG. 9A, may be grouped on the basis that each resource in the cluster contains the classification term "Chicago Bulls," resources in cluster B may be grouped on the basis that each resource in the cluster contains the classification term "Laney High School" (the high school of Jordan the basketball player), etc. A cluster associated with the other Michael Jordan identity (e.g., cluster D, E, or F) may be associated with a classification term such as "Berkeley" or "Soda Hall," associated with Michael Jordan the computer scientist. Some clusters can be built to include resources that include any one of a set of classification terms determined to be related. For instance, in that "Berkeley" and "Soda Hall" each refer to Professor Jordan's place of employment (i.e., UC Berkeley), resources that reference one or both of these classification terms may be included in the same cluster. In another example, otherwise distinct classification terms may be grouped within a single cluster on the basis that the terms often appear together in the same resources. For instance, classification terms "Chicago Bulls" and "Washington Wizards," both describing distinct professional basketball franchises, may be nonetheless grouped together as the basis of a single cluster upon recognizing that the classification terms, themselves bare a relation based on their common appearance within the same resources. For example, if two or more distinct classification terms are included within a particular percentage of resources including one or the other classification term, it can be determined that the distinct classification terms are related. For example, resources containing either one or both terms can be associated with the resulting cluster on the basis that the team names often appear together in resources directed to the National Basketball Association.

Constructing classification clusters each based on multiple, related classification terms can lead to clusters that cover certain, distinctive personal characteristics. For instance, one cluster, associated with Michael Jordan the basketball player, may be based on a collection of classification terms relating to professional basketball, while another cluster may be based on a collection of terms relating to minor league baseball (pertinent to Jordan's short-lived baseball career). Distinctive clusters that are less likely to overlap with other clusters, can instill confidence that an identity determined based on the cluster, is distinct from other identities. Distinctive clusters can also be based on a single classification term. While distinctive clusters are less likely to overlap other clusters, intersections that do emerge can be attributable to a common person identity involved in the subject matter of both clusters. Such is to be expected, as people seldom live one-dimensional lives and can have relationships with several distinct associations, locations, and endeavors. For instance, a person may be a graphic designer by vocation and participate in triathlons on the weekend. While many resources referencing this person may be focused on either the person's graphic design career or triathlon hobby, some resources may refer to the person's involvement in both. In the Michael Jordan example, two clusters may be constructed, one directed to "Looney Tunes," based on basketball player Jordan's role in the movie "Space Jam" and various other marketing campaigns, and another cluster directed to Chicago Bulls. But for Jordan's involvement with both Looney Tunes and the Chicago Bulls, there may be little overlap between web pages, and classification clusters, directed to the Chicago Bulls or professional basketball, and terms related to Looney Tunes. As shown, the person identities themselves can create overlap between the distinct classification clusters, lending confidence to a determination to group variant clusters to identify a person identity.

In some implementations, it can be desirable to limit the words and phrases that can be used as classification terms, to create distinctive classification clusters. Acceptable classification terms can be pre-defined, such as terms pre-identified as useful for person searching (e.g., geographical terms, dates, etc.) and accessed from an index of pre-identified classification terms. Additionally, classification terms can be identified dynamically within a set of resources based on the frequency of a term's use within the set. For instance, the word "New York" or "University" may be so common within the set 900 of resources, as to be of little or no value in differentiating one cluster, resource, or instance of a person name, from another, on the basis of identity. For instance, if "New York" were used as a classification term, it could be very likely that an overlap could develop between cluster groupings that, in actuality, are directed to two, distinct person identities. FIG. 9B is a schematic representation of a second example set of digital resources and corresponding classification clusters. As shown in FIG. 9B, a seventh cluster G is shown, establishing a relationship between Documents 8 and 9, and thereby linking the two otherwise distinct cluster groupings and person identities. If cluster G is inclusive enough to be directed to multiple person identities of the same name (here, the two Michael Jordans), the system may mistakenly conclude that the same Michael Jordan who enjoyed an illustrious basketball career is also a respected computer scientist. This problem can be avoided, for example, by restricting the bases of clusters to classification terms that are relatively unique (i.e., less frequently used within the resource set), or by limiting the clusters considered in determining person identities to those clusters that are narrowly-tailored (e.g., smaller clusters, or clusters associated with a common type of resource or resource source (e.g., where resources in the cluster tend to share a common URL prefixes, etc.)) or clusters based on relatively unique classification terms.

Determining whether a classification term is suitable for use as the basis of a classification cluster can involve first determining the uniqueness of the term. The less likely a classification term appears in resources generally, the less likely it is to appear in distinct resources referencing distinct person identities. Additionally, in some implementations, rules are established for determining what types of words and phrases can qualify for use as classification terms. Such rules can also make the identification of classification terms less resource intensive, limiting the universe of words that will be considered as possible classification terms. For instance, terms can be selected that are often associated with a person, such as the name of a city, company, city street, zip code, URL, email address, or phone number. Person-related terms can also be quite rare. For instance, a small city, region, or district may only be associated with a small percentage of the universe of resources and qualify as a good candidate for a classification term relating to a person. Other person-related terms, including larger cities or common geographical names may be too common for use as classification terms. Additionally, in that classification terms are ultimately used to determine identities for a person name, some implementations can require that classification terms, or instances of classification terms, only be considered when they are located within a certain proximity to a person name included in the resource. Such a requirement can help to avoid use of uncommon words, e.g., "phytoplankton," not typically associated with a person as a classification term.

Classification terms can be identified and indexed in advance of building clusters for a set of resources. In some instances, a classification term index can be included as part of or joined with the name index. A web crawler can be used to mine resources for classification terms, including associations between classification terms, person names, and resources. Indexing of the resource data, person names, and/or classification terms can take place at the same time, using a common web crawler or set of web crawlers. As with other indexes described herein, indexing classification terms can allow for a robust collection of classification terms to be collected, capable of being quickly accessed for use in determining person names and person name relationships associated with a set search results. Among the data included in a term index of identified classification terms, some examples of a term index can also include data for identifying resources in which the term appears, other terms appearing in the resource, person names appearing with the term in the resource, or the distance between each person name and the term. The index can further be used to determine the usefulness of a potential term in building classification clusters. For instance, the index can be used to determine the frequency or probability of a particular term being included in a resource.

FIG. 10A is a table 1000 showing an example selection of classification terms 1005 for use in building classification clusters. The potential terms 1005 available for consideration can be limited to certain types of words and phrases, such as words likely to associated with a person. For instance, potential terms can be retrieved to include those with character patterns resembling an email address, resulting in a web crawler searching digital resources for terms with a format [name]@[domain].[extension]. Other potential terms can be selected on the basis that they contain multi-word combinations, with each word capitalized, as would be common for a place name, professional title, or person name. Other criteria and characteristics can also be employed to limit the potential classification terms from the universe of other terms appearing in the network's resources.

A term frequency (TF) 1010 can be calculated for each of the potential classification terms 1005 relating to the frequency with which a term appears in resources on the network. The term frequency 1010 can be the number or percentage of resources in which a term appears. In some examples, the term frequency 1010 can also, or instead, relate to the total number of appearances of a term across a set of resources, as well as take into account repetitive uses of a term within a single resource. In this example, a total number 1012 of resources containing an instance of the term has been determined for the set of resources. The number 1012 of resources containing the term can be used to determine a term frequency 1010, based on the probability that a term will appear in any resource or subset of resources on a network. Additionally, in some examples, a name frequency (NF) 1015 can also be determined for each potential person name 1005. The name frequency 1015 can relate to the frequency with which the term appears together, in proximity to, or otherwise in conjunction with an identified person name in the set of network resources. A name index can be consulted for use in determining the name frequency of a term. A name frequency 1015 can be, for example, the probability that the term will appear with any known or potential person name in a reference. In other examples, the name frequency can relate to the probability that a term will appear within a certain proximity of a person name in the same reference. In some examples, name frequency 1015 can be based on the probability that a term will appear in conjunction with any part of a person name, a word that has the potential to be a person name, or a subset of person names known to the system.

Determining whether a particular term should be used as the basis for a cluster can include consideration of the potential term's 1005 term frequency 1010, name frequency 1015, or other metrics. In some examples, a score 1020 can be determined for a potential term's usefulness as a classification term. The score can be based, as in the example of FIG. 10A, upon a combination of the term frequency and name frequency. Other factors can also be considered. Selection of a term 1005 as a classification term can include determining whether the score 1020 of the term exceeds a threshold value. The threshold can be a relative or fixed value. For instance, in the example of FIG. 10A, terms that have a score lower than "500" can be selected 1022 as a classification term. Other examples can employ alternate scoring methods, threshold values, and standards. In this particular example, all of the terms included in the table 1000 have been deemed acceptable for use as classification terms, with the exception of the term "Toronto Canada." "Toronto Canada" appears in over 150 million resources on the network and, as a result, has been determined to be insufficiently capable of being used to distinguish between multiple identities of the same person name.

FIG. 10B is a table 1025 showing selected records in an example term index. The table 1025 illustrates a selection from an example classification term index 1025, incorporating some of the potential terms 1005 included in the table 1000 of FIG. 10A. A classification term table can include records 1030 of instances of each classification term 1032 appearing in or associated with resources 1035 in a set. In some instances, a classification term index 1025 can also include person names 1040 appearing in the same resource 1035. For instance, Record 1 includes an instance of a term "Jarmans Gap Road" in a resource with URL "www.domain1.com/page" that includes reference to a person name "John Doe." The same resource can also reference other names (e.g., Record 2). Additionally, in some implementations, a record 1030 can indicate the distance 1045 of an identified person name 1040 from the term 1032 in the record 1030. For instance, in Record 4, "John Doe" is a distance of six words from the term "Jarmans Gap Road." A proximity value 1045 can be used, for example, to build a refined classification cluster including only those names in close proximity to the classification term.

Instances of classification terms 1032 appearing with person names 1040 can be identified based on data collected by a web crawler that scans resources on a network. In some instances, the names associated with a classification term record 1030 can be limited to those person names appearing within a predetermined proximity of the classification term. For instance, in the example of FIG. 10B, identification of a person name associated with a classification term can be limited to person names within, for example, twenty words or characters of the classification term. While FIG. 10B illustrates a classification term index as a single table, a classification term index can include multiple tables. For instance, a separate table can be built for each classification term, or for relationships of a classification term with a particular resource or a particular person name. In some instances, a classification term index can also include a separate listing or table defining relationships with other identified classification terms, as well as tables storing a listing of classification clusters to which a classification term has been determined to belong. In other implementations, classification terms may be identified from an overall term index for a collection of resources rather than by generating a separate classification term index.

Classification clusters can be built based on one or more classification terms identified in a set of resources. For instance, the classification terms "Jarmans Gap Road," "Crozet Virginia," "johndoe1435@example.com," and "Vice Provost" can each be the basis of a classification cluster. Additionally, in some instances, two or more of the classification terms can be the basis of a cluster. For instance, Jarmans Gap Road may be a road in Crozet, Virginia and appear together often in the same resource. A high correlation between two or more classification terms can be identified and a corresponding classification cluster formed on the basis of the correlating terms. Classification clusters based on one term in a set of correlating classification terms can be merged together with classification clusters based on the other terms in the set to form a single classification cluster. A multi-term classification cluster can include resources, and associated person names, that contain or relate to only one of the classification terms associated with the cluster, to multiple terms, or all terms associated with the cluster. For instance, there may be a Jarmans Gap Road in another city beside Crozet, Va. Two classification clusters can be formed, one for Jarmans Gap Road in Crozet, the second for Jarmans Gap Road in the second city. Accordingly, resources identified with either cluster would need to contain references to both "Jarmans Gap Road" and the respective city name.

In the example of FIG. 10B, the classification terms' relationships with a person name "John Doe" can be used to determine that multiple identities are likely associated with "John Doe," or any other identified person name in the set of resources. In this particular example, it may be determined that at least two identities exist for "John Doe" based on the classification term instances and resulting clusters, identified in the illustrated term index selection 1025. For instance, it may be established that an overlap exists between the "Jarmans Gap Road" and "Crozet Virginia" classification terms (and/or clusters) based, for example, on resources "www.domain2.com/page" and "www.domain1.com/page" each containing references to "Jarmans Gap Road," "Crozet Virginia," and "John Doe" (at Records 1, 3, 8, and 9). On this basis, in some instances, it can be determined that a first John Doe is associated with "Jarmans Gap Road" and "Crozet Virginia," perhaps due to a home, business, or associate's address appearing frequently with this mention of John Doe on the network. A second John Doe identity can be determined, in some instances, based on an identified overlap, at resources "www.domain5.com/page" and "www.domain7.com," between the "johndoe1435@example.com" and "Vice Provost" classification terms (at Records 11 and 13). The second John Doe may be a Vice Provost of a university with an email address "johndoe1435@example.com." Considering that there is no overlap between "Jarmans Gap Road" or "Crozet Virginia" and "johndoe1435@example.com" or "Vice Provost," in some implementations, these distinct classification clusters can be sufficient to determine that there are two, unique identities of John Doe. In some examples, the lack of an overlap may not be required to determine that multiple identities exist. For instance, a criterion can be applied that requires a certain threshold number, or percentage, of instances of overlap between two classification terms or clusters before concluding that the terms or clusters are related. Such a criterion can help to limit false positives derived from outlying instances of circumstantial overlaps between classification clusters. Additionally, in that some resources may be directed to the disambiguation of name itself (e.g., a resource discussing that two Michael Jordan's exist), additional criteria can be employed that identify words or phrases in a resource that suggest that the resource is directed to more than one person identity of the same name. A resource containing references to multiple identities of a same name can be flagged so as not to serve as the basis for an overlap between terms or clusters. In other examples, resources containing references to multiple identities can be separately flagged for presentation to a user. Such references may be of particular use to users in that they potentially detail the distinction between two or more people having a common person name.

Classification terms and clusters can be used in conjunction with a search performed by a search engine to distinguish between person identities. Classification terms are typically identified in advance of the search (e.g., through indexing) but in some cases can be identified at the time of the search for a given set of search results. Similarly, classification clusters can be established for sets of resources prior to a search or at the time of the search. For instance, a search query can result in a set of search results being identified that include the resources 1035 shown in FIG. 10B. Person name search results can also be derived for the search. In this particular example, the names "John Doe," "Joe Schmo," and "Jane Doe" can be included as results for a query where the results are to be presented in person name categories. Additionally, as discussed above, two identities, or disambiguations, for "John Doe" can be identified and presented to the user. The two, identified John Doe's may be shown in a listing of names returned for the person name search (such as shown in the example of FIG. 7), or as a single John Doe name in the listing, with a link or other identifier indicating that at least one disambiguation has been determined to exist for the name. In some examples, clicking on a disambiguation identifier can direct the user to a second page outlining the multiple identities identified for a particular person name (such as in FIG. 7). Additionally, in some instances, classification terms, associated with each identity of a person name, can be displayed together with the disambiguated listing of the name, to assist the user in identifying the person associated with each name identity and/or to help the user understand the basis of the disambiguation.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions tangibly stored on one or more computer-readable storage devices for execution by, or to control the operation of, data processing apparatus. Alternatively or in addition, the one or more computer programs can be tangibly encoded in a propagated signal, which is an artificially generated signal, e.g., a machine-generated electrical, optical, or electromagnetic signal, that is generated to encode information for transmission to suitable receiver apparatus for execution by a computer. A computer-readable storage device can be a machine-readable storage device, a machine-readable storage substrate, a memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (which may also be referred to as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of any invention or of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying a plurality of non-person-name classification terms from a group of digital resources, each of the plurality of classification terms used to group the group of digital resources into a plurality of classification clusters, each particular classification cluster distinguished from other classification clusters based on the presence or absence of a classification term;
   grouping the group of digital resources into the plurality of classification clusters, each digital resource associated with a particular classification cluster based upon the inclusion in the digital resource of at least one of the plurality of classification terms;
   identifying, by operation of a computer, person names appearing in the digital resources associated with each classification cluster;
   determining a score of a probabilistic determination that two or more words are related to the particular person name;
   eliminating storing false positives in a name index by storing each particular name in the name index when the score of the probabilistic determination for the two or more words exceeds a defined threshold;
   identifying, by operation of a computer, at least two or more persons corresponding to a particular person name, each person identified based upon at least one particular common or related classification term relating particular classification clusters, where the particular classification clusters are distinct from any other classification clusters associated with any other person identified for the particular person name;
   identifying, by operation of a computer, groupings of digital resources associated with each person identified based on the digital resources associated with the related particular classification clusters associated with the respective person; and
   in response to receiving a search query related to a particular person name, initiating a display of a disambiguated listing of the at least two or more persons corresponding to the particular person name, each person listing comprising a nested listing of multiple digital resources associated with the respective person.

2. The method of claim 1 wherein each digital resource in the set of digital resources includes the particular person name.

3. The method of claim 1 wherein the search results interface includes:
   a first listing corresponding to the particular person name for a first person corresponding to the particular person name; and
   a second listing corresponding to the particular person name for a second person corresponding to the particular person name.

4. The method of claim 3 further comprising:
   receiving an input selecting the first person; and
   presenting a search results listing of digital resources associated with the first person in response to the input, wherein the listing of digital resources includes hyperlinks to each of the digital resources in the listing.

5. The method of claim 1 further comprising:
   selecting, by operation of a computer system, the classification terms from terms in the set of digital resources, including selecting the classification terms according to a relative uniqueness of each classification term in the set of digital resources.

6. The method of claim 1 wherein each classification cluster is identified based on an identification of relationships between classification terms in the set of digital resources.

7. The method of claim 1 wherein identifying person names associated with each classification cluster includes identifying a person name in a digital resource within a predetermined proximity of a classification term corresponding to the classification cluster.

8. The method of claim 1 wherein the set of classification terms for at least one of the clusters includes only a single classification term.

9. The method of claim 1 wherein identifying a person further comprises assigning a score to each occurrence of the person name in proximity to a classification term, wherein higher scores are assigned to occurrences involving the classification term in closer proximity to the person name.

10. The method of claim 1 wherein the person names are identified based on expected characteristics of person names.

11. A system comprising:

a search engine operable to identify a plurality of digital resources satisfying a search query related to a particular person name;

one or more computers including one or more computer storage devices storing instructions for causing the one or more computers to:

identify a plurality of non-person-name classification terms from a group of digital resources, each of the plurality of classification terms used to group the group of digital resources into a plurality of classification clusters, each particular classification cluster distinguished from other classification clusters based on the presence or absence of a classification term;

group the group of digital resources into the plurality of classification clusters, each digital resource associated with a particular classification cluster based upon the inclusion in the digital resource of at least one of the plurality of classification terms;

identify person names appearing in the digital resources associated with each classification cluster;

determine a score of a probabilistic determination that two or more words are related to the particular person name;

eliminate storing false positives in a name index by storing each particular name in the name index when the score of the probabilistic determination for the two or more words exceeds a defined threshold;

identify at least two or more persons corresponding to a particular person name, each person identified based upon at least one particular common or related classification term relating particular classification clusters, where the particular classification clusters are distinct from any other classification clusters associated with any other person identified for the particular person name;

identify groupings of digital resources associated with each person identified based on the digital resources associated with the related particular classification clusters associated with the respective person; and in response to receiving a search query related to a particular person name, initiate a display of a disambiguated listing of the at least two or more persons corresponding to the particular person name, each person listing comprising a nested listing of multiple digital resources associated with the respective person.

12. The system of claim 11 wherein the display includes an indication that at least two persons have been identified.

13. The system of claim 11 wherein the display is adapted for presentation on a user interface of a user device communicating with the one or more computers over a wide area network.

14. The system of claim 11 further comprising one or more databases storing a term index including associations between classification terms identified in digital resources.

15. A tangible, non-transitory computer storage medium encoded with a computer program, the program comprising instructions that when executed by one or more computers cause the one or more computers to perform operations comprising:

identifying a plurality of non-person-name classification terms from a group of digital resources, each of the plurality of classification terms used to group the group of digital resources into a plurality of classification clusters, each particular classification cluster distinguished from other classification clusters based on the presence or absence of a classification term;

grouping the group of digital resources into the plurality of classification clusters, each digital resource associated with a particular classification cluster based upon the inclusion in the digital resource of at least one of the plurality of classification terms;

identifying person names appearing in the digital resources associated with each classification cluster;

determining a score of a probabilistic determination that two or more words are related to the particular person name;

eliminating storing false positives in a name index by storing each particular name in the name index when the score of the probabilistic determination for the two or more words exceeds a defined threshold;

identifying at least two or more persons corresponding to a particular person name, each person identified based upon at least one particular common or related classification term relating particular classification clusters, where the particular classification clusters are distinct from any other classification clusters associated with any other person identified for the particular person name;

identifying groupings of digital resources associated with each person identified based on the digital resources associated with the related particular classification clusters associated with the respective person; and in response to receiving a search query related to a particular person name, initiating a display of a disambiguated listing of the at least two or more persons corresponding to the particular person name, each person listing comprising a nested listing of multiple digital resources associated with the respective person.

16. The method of claim 1 further comprising:

storing each classification term in a record of an index, each record including identification of at least one digital resource that includes the classification term;

using the index to identify, in digital resources including the particular person name, at least a first classification term and a second classification term;

using the index to identify a first cluster of digital resources in the digital resources including both the particular person name and the first classification term; and using the index to identify a second cluster of digital resources in the digital resources including both the particular person name and the second classification term.

17. The method of claim 16 wherein identifying a person is based at least in part on whether the particular person name appears within a predefined proximity of the first classification term in a digital resource.

18. The method of claim 1 wherein identifying classification terms in a digital resource includes identifying words in at least one predefined category of words.

19. The method of claim 18 wherein the at least one predefined category of words includes at least one of email address, URL, geographical name, or title.

20. The method of claim 1 wherein each digital resource includes text.

21. The method of claim 1 further comprising identifying a subset of the digital resources satisfying a search query.

* * * * *